US006718398B1

United States Patent
Dontje et al.

(10) Patent No.: US 6,718,398 B1
(45) Date of Patent: Apr. 6, 2004

(54) ROBUST COMMUNICATIONS CONNECTION SYSTEM AND METHOD FOR SHARED MEMORY

(75) Inventors: Terry D. Dontje, Maynard, MA (US); Steven J. Sistare, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/337,588

(22) Filed: Jun. 21, 1999

(51) Int. Cl.[7] .................... G06F 9/46; G06F 15/167
(52) U.S. Cl. .................. 709/312; 709/313; 709/213; 709/215
(58) Field of Search ................ 709/201–203, 709/223, 224, 100, 310–314, 213–216

(56) References Cited

U.S. PATENT DOCUMENTS

| 5,230,051 A | * | 7/1993 | Quan ..................... 709/312 |
| 5,528,761 A | | 6/1996 | Ooba et al. |
| 5,537,569 A | | 7/1996 | Masubuchi |
| 5,710,881 A | | 1/1998 | Gupta et al. |
| 6,212,610 B1 | | 4/2001 | Weber et al. |
| 6,519,686 B2 | * | 2/2003 | Woodring et al. .......... 711/147 |
| 6,601,089 B1 | * | 7/2003 | Sistare et al. .............. 709/213 |

* cited by examiner

*Primary Examiner*—John Follansbee
*Assistant Examiner*—Lewis A. Bullock, Jr.
(74) *Attorney, Agent, or Firm*—Meyertons Hood Kivlin Kowert & Goetzel, P.C.; B. Noël Kivlin; Rory D. Rankin

(57) ABSTRACT

A communications arrangement is described for facilitating transfer of messages among a plurality of processes in a computer system. The communications arrangement comprises a channel data structure, a status daemon and an exit handler. The channel data structure includes a channel status flag normally having one of a plurality of conditions, and a plurality of storage locations each configured to receive message information. The status daemon is configured to determine the operational status of the processes. The exit handler is configured to, in response to the status daemon determining a predetermined condition in connection with at least one of the processes, condition the channel status flag to another of the conditions, thereby to indicate to the other processes a failure condition in connection with the communications arrangement.

17 Claims, 7 Drawing Sheets

ROBUST COMMUNICATIONS
CONNECTION SYSTEM AND METHOD FOR
SHARED MEMORY

FIELD OF THE INVENTION

The invention relates generally to the field of digital computer systems, and more specifically to robust systems and methods for facilitating communications among processes executed in a shared-memory computer system.

BACKGROUND OF THE INVENTION

Computers typically execute programs in one or more processes or threads (generally "processes") on one or more processors. If a program comprises a number of cooperating processes which can be processed in parallel on a plurality of processors, sometimes groups of those processes need to communicate to cooperatively solve a particular problem. Two basic architectures have been for multi-processor computer systems, namely, distributed memory systems and shared memory systems. In a computer system constructed according to the distributed memory architecture, processors and memory are allocated to processing nodes, with each processing node typically having a processor and an associated "node memory" portion of the system memory. The processing nodes are typically interconnected by a fast network to facilitate transfer of data from one processing node to another when needed for, for example, processing operations performed by the other processing node. Typically in a computer constructed according to the distributed memory architecture, a processor is able to access data stored in its node memory faster that it would be able to access data stored in node memories on other processing nodes. However, contention for the node memory on each processing node is reduced since there is only one processor, that is, the processor on the processing node, which accesses the node memory for its processing operations, and perhaps a network interface which can access the node memory to store therein data which it received from another processing node, or to retrieve data therefrom for transfer to another processing node.

Typically, in a computer system constructed according to the shared memory architecture, the processors share a common memory, with each processor being able to access the entire memory in a uniform manner. This obviates the need for a network to transfer data, as is used in a computer system constructed according to the distributed memory architecture; however, contention for the shared memory can be greater than in a computer system constructed according to the distributed memory architecture. To reduce contention, each processor can be allocated a region of the shared memory which it uses for most of its processing operations. Although each processor's region is accessible to the other processors so that they (that is, the other processors) can transfer data thereto for use in processing by the processor associated with the respective region, typically most accesses of a region will be by the processor associated with the region.

A computer system can be constructed according to a combination of the distributed and shared memory architectures. Such a computer system comprises a plurality of processing nodes interconnected by a network, as in a computer system constructed according to the distributed memory architecture. However, each processing node can have a plurality of processors which share the memory on the respective node, in a manner similar to a computer constructed according to the shared memory architecture.

Several mechanisms have been developed to facilitate transfer of data among processors, or more specifically, between processing node memories, in the case of a computer system constructed according to the distributed memory architecture, and/or memory regions, in the case of a computer system constructed according to the shared memory architectures. In one popular mechanism, termed "message passing," processors transfer information by passing messages thereamong. Several well-known message passing specifications have been developed, including MPI and PVM. Generally, in message passing, to transfer data from one processor to another, the transferring processor generates a message including the data and transfers the message to the other processor. On the other hand, when one processor wishes to retrieve data from another processor, the retrieving processor generates a message including a retrieval request and transfers the message to the processor from which the data is to be retrieved; thereafter, the processor which receives the message executes the retrieval request and transfers the data to the requesting processor in a message as described above.

SUMMARY OF THE INVENTION

The invention provides a new and improved system and method for facilitating communications among processes in a shared memory computer system.

In brief summary, the invention provides a communications arrangement for facilitating transfer of messages among a plurality of processes in a computer system. The communications arrangement comprises a channel data structure, a status daemon and an exit handler. The channel data structure includes a channel status flag normally having one of a plurality of conditions, and a plurality of storage locations each configured to receive message information. The status daemon is configured to determine the operational status of the processes. The exit handler is configured to, in response to the status daemon determining a predetermined condition in connection with at least one of the processes, condition the channel status flag to another of the conditions, thereby to indicate to the other processes a failure condition in connection with the communications arrangement.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN
ILLUSTRATIVE EMBODIMENT

Figure 1:
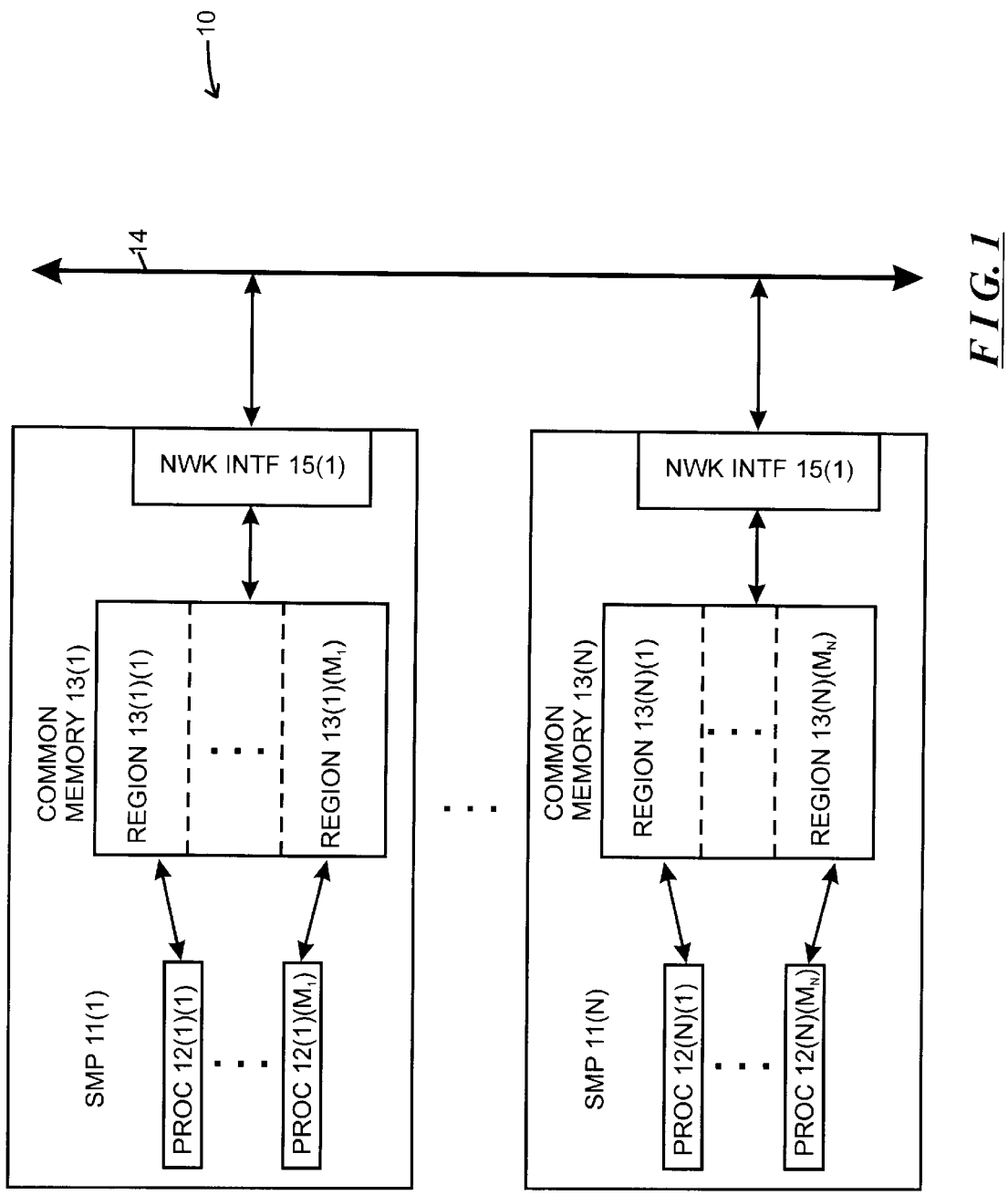
FIG. 1 schematically depicts a computer system including a communications arrangement for transferring messages among a plurality of processes in a shared-memory computer system, constructed in accordance with the invention.

FIG. 1 schematically depicts a computer system including an arrangement for including an arrangement for allocating buffers for message passing in a shared-memory computer system, constructed in accordance with the invention.

Generally, the computer system 10 includes one or more computers 11(1) through 11(N) (generally identified by reference numeral 11(n)), interconnected by a network represented by communication link 14. At least some of the computers 11(n) are constructed along a symmetric multi-processor ("SMP") architecture, with each SMP including hardware resources comprising a plurality of processors (not separately shown) which share common memory resources (also not separately shown). In the following, it will be assumed that the computers 11(n) are all constructed along the lines of an SMP architecture, and may also be referenced as SMP's 11(n). In the computer 10 depicted in FIG. 1, each SMP 11(n) can process in parallel a plurality of processes or threads (generally, "processes") 12(1)(1) through 12(N)(M) (generally identified by reference numeral 12(n)(m)) organized in one or more programs. The processes 12(n)(m) in each SMP 11(n) share a common memory 13(n), with each process being allocated a region 13(n)(m) of the memory 13(n). The total number of processes 12(n)(m) which each SMP 11(n) can execute may be greater than the total number of processors which the respective SMP 11(n) maintains, and, if so, the computer's operating system (not shown) will enable the processes to be executed in a series of time intervals or slots, with selected ones of the processes 12(n)(m) being executed at any point in time.

As noted above, each process 12(n)(m) is allocated a region 13(n)(m) of the common memory 13(n), which it will normally use in its processing operations. Each process 12(n')(m') can, however, communicate with another process 12(n')(m")(m"≠m')) to send information thereto by sending one or more messages thereto. The messages effectively result in the storing of information in the memory region 13(n')(m") of memory 13(n') allocated to that process 12(n')(m"). A number of message passing methodologies which may be used by the processes 12(n)(m) are known to those skilled in the art. After the information has been stored into the memory region 13(n')(m") allocated to that process 12(n')(m"), the process 12(n')(m") can use the information in its processing operations.

As noted above, the SMP's 11(n) are interconnected by a communication link 14. Each SMP also includes a network interface 15(n) to connect the respective SMP 11(n) to the communication link 14 to facilitate transfer of information among the SMP's 11(n), and specifically among processes 12(n)(m) maintained thereby. For example, a process 12(n')(m') can communicate with another process 12(n")(m") (where n"≠n', but m" may equal m') to send information thereto by sending one or more messages thereto. In that case, the messages will be transmitted by the network interface 15(n') of SMP 11(n') and transmitted over the communication link 14 to the network interface 15(n") of SMP 11(n"), and the network interface 15(n") will, in turn, store the information in the memory region 13(n")(m") associated with the process 12(n")(m"). After the information has been stored into the memory region 13(n")(m") allocated to that process 12(n")(m"), the process 12(n")(m") can use the information in its processing operations.

Figure 2:
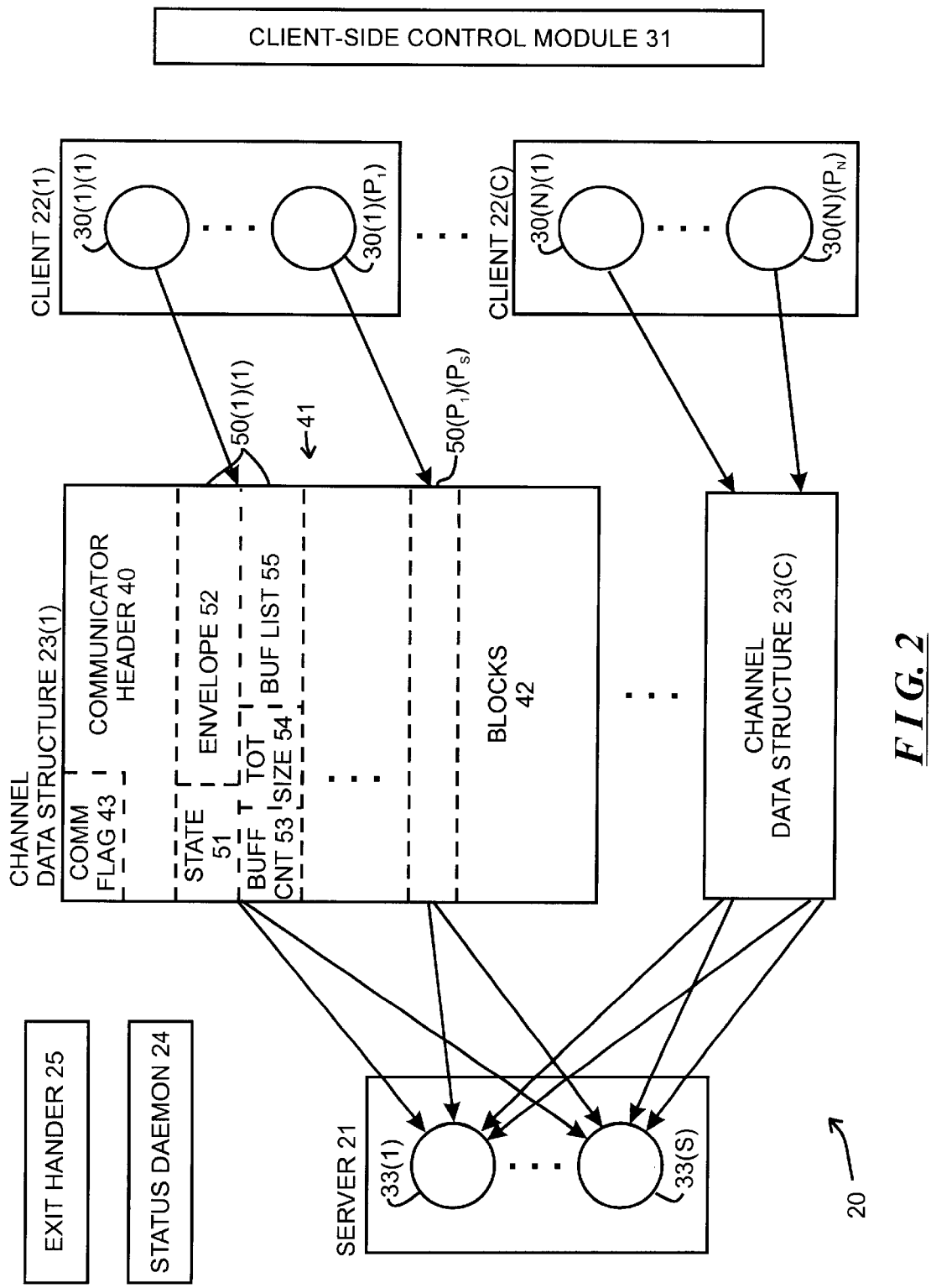
FIGS. 2 and 3 schematically depict data structures which are useful in connection with the communications arrangement for the computer system depicted in FIG. 1.
Figure 3:
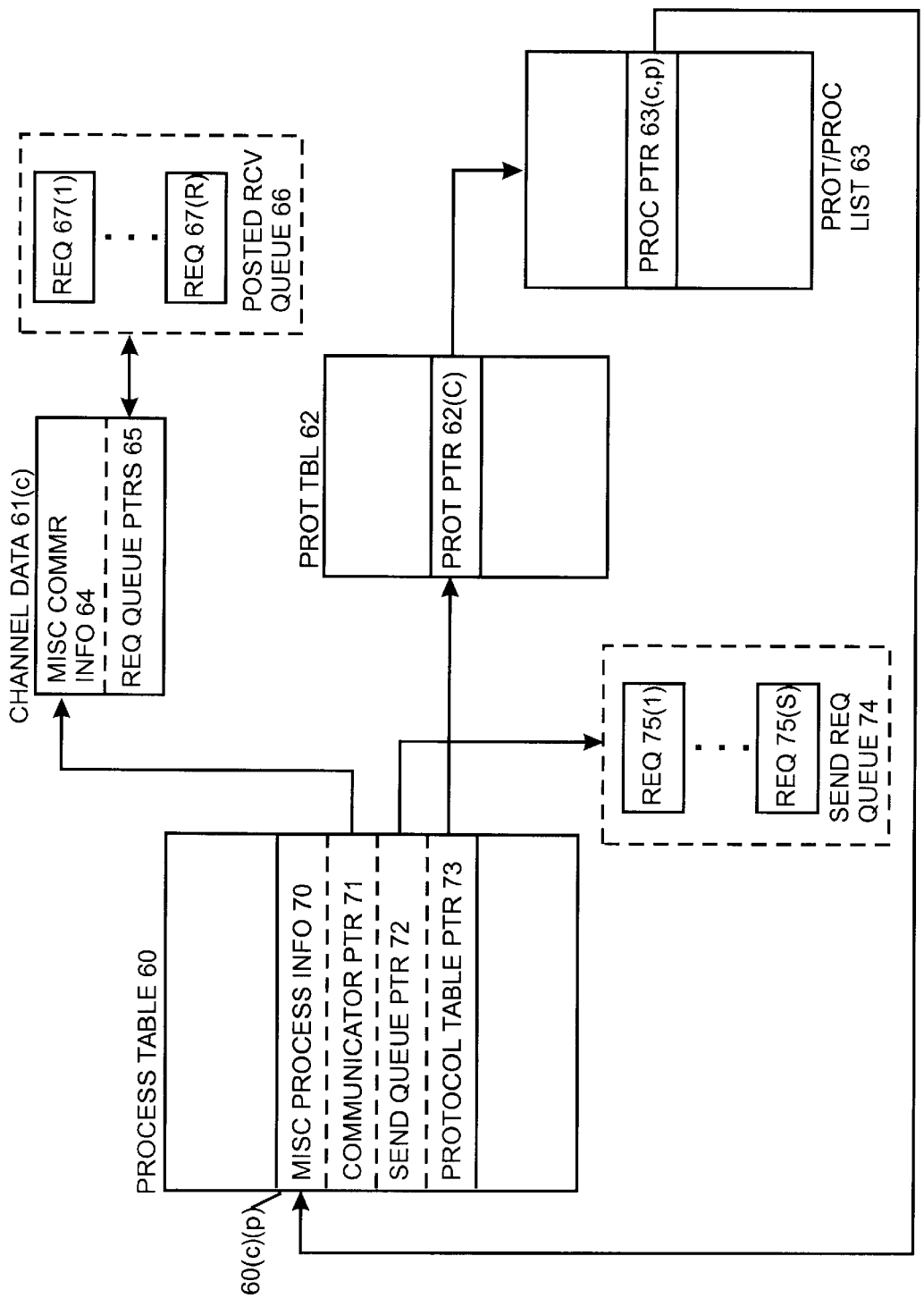

The invention provides an arrangement for facilitating communications among a plurality of processes 12(n)(m) executed by the computer system 10. The communication arrangement will be described in connection with FIGS. 2 through 5. FIG. 2 generally depicts the communications arrangement, including a plurality of communicator channels and channel data structures, and FIG. 3 depicts details of data structures used by the communications arrangement in connection with one aspect of the invention to be described below. Essentially, processes 12(n)(m) make use of "communicators" to actually transfer information therebetween. Generally, the communicators operate in a client/server configuration, in which a client, upon receiving a message from a process 12(n)(m), transfers information to a server. The server, in turn, can transfer the information to another process 12(n')(m') (where one of n' and m', but not both, can correspond to n and m, respectively) for processing.

With reference to FIG. 2, the communications arrangement 20 as shown there includes one server 21 and a plurality of clients 22(1) through 22(C) (generally identified by reference numeral 22(c)). Each client 22(c), in turn, is associated with a respective channel data structure 23(c) which it (that is, client 22(c)) uses to transfer information to the server 21. A single server 21 can receive information from plurality of clients 22(c) through respective channel data structures 23(c), whereas generally a client 22(c) will only communicate with one server 21. A client 22(c) and its associated channel data structure 23(c), along with the server 21, may be referred to herein as a "communicator." It will be appreciated that the server 21 may form part of a plurality of communicators, each associated with one of the clients 22(c) and associated channel data structure 23(c). The computer system 10 may comprise a plurality of servers, each of which, in turn, can form part of one or more communicators.

The communications arrangement 20 further includes a process status daemon 24 and an exit handler 25. Generally, the process status daemon 24 monitors the operational status of the communicators, particularly the operational status of the clients 21(c). If a problem arises in connection with the operations of a client 22(c), the process status daemon 24 calls the exit handler 25 to condition a flag, which will be described below as a communicator status flag, in the channel data structure to indicate that the communicator is shut down. The exit handler 25 can also arrange for an orderly shut-down of the client 22(c).

The clients 21(c) and respective channel data structures 23(c) are all similar and so one client, namely, client 22(1) and its associated channel data structure 23(1) will be described in detail. As shown in FIG. 2 client 22(1) comprises one or more client processes 30(1)(1) through 30(1)(P$_1$) (generally identified by reference numeral 30(1)(p)), and a client-side control module 31. Similarly, the server comprises a one or more server processes 33(1) through 33(P$_S$) (generally identified by reference numeral 33(p)). Each client process 30(1)(p) receives information from various ones of the processes 12(n)(m) (FIG. 1) and loads them into the channel data structure 23(1). After a client process 30(1)(p) has loaded information into the channel data structure 23(1), the server 21 can retrieve the information therefrom and transfer it to the particular process 12(n)(m) that is to execute the information.

Before proceeding further, it would be helpful to describe the channel data structure 23(1) in detail. In the communications arrangement 20, the channel data structure 23(1) includes a three primary sections, including a header section 40, a postbox section 41 and a data blocks section 42. The header section 40 stores information relating to the channel data structure, and, with particular reference to one aspect of the invention, includes a communicator status flag 43 whose condition indicates the operational status of the communicator including the channel data structure 23(c). The postbox section 41 includes a plurality of postboxes 50(1)(1) through 50(P$_1$)(P$_S$) (generally identified by reference numeral 50(p)(p')), with postboxes 50(1)(1) through 50(1)(P$_S$) being associated with client process 30(1)(1), postboxes 50(2)(1) through 50(2)(P$_S$) being associated with client process 30(1)

(2), and so forth. Each client process 30(1)(p) will load at least some portion of the information which it receives from the processes 12(n)(m) into respective ones of the postboxes 50(p)(1) through 50(p)(P$_S$). Similarly each of the postboxes 50(1)(1) through 50(1)(P$_S$) is associated with server process 33(1), postboxes 50(2)(1) through 50(2)(P$_S$) is associated with server process 33(2), and so forth. Accordingly, client process 30(1)(p) will load information which it receives from the process 12(n)(m) into the postbox 50(p)(p') that is associated with the server process 33(p') which is to receive the information. If, for example, the client process 30(1)(1) receives information that is to be transferred to a process 12(n)(m) that uses server process 33(1), it will load at least some portion of the information into the postbox 50(1)(1) that is associated with both client process 30(1)(1) and server process 33(1). On the other hand, if the client process 30(1)(1) receives information that is to be transferred to a process 12(n)(m) that uses server process 33(P$_S$), it will load at least some portion of the information into the postbox 51(1)(P$_S$) that is associated with both client process 30(1)(1) and server process 33(P$_S$). As will be described below, after a client process 30(1)(p) has loaded at least some portion of information into a postbox 50(p)(p'), it will not be able to use the postbox 50(p)(p') again until the server process 33(p') has retrieved the information therefrom; to accommodate that, in one embodiment, each client process 30(1)(p) has several postboxes associated with each server process 33(p). Although the postbox section 41 has been described as including postboxes only for use by client processes in transferring information to respective server processes, it will be appreciated that the postbox section 41 may also include postboxes for use by server processes in transferring information to respective client processes.

The blocks section 42 comprises a plurality of blocks each of pre-determined size. As noted above, the client processes 30(1)(p) use their respective postboxes 50(p)(p') for a portion of the respective information that they load into the channel data structure 23(1). If information is sufficiently small as to fit into a postbox 50(p)(p'), the client process 30(1)(p) will load the information into the postbox 50(p)(p'). In that case, the contents of the postbox 50(p)(p') will be organized according to the structure defined for the type of information which has been loaded into the postbox 50(p)(p').

On the other hand, if the information is too large to fit into a postbox 50(p)(p'), which may be the case if the information is a send information including a significant amount of data, the client process 30(1)(p) will load the information into one or more blocks in blocks section 42, and load information as to the blocks which contain the information into the postbox 50(p)(p'). In that case, the contents of postbox 50(p)(p') will be organized into fields as depicted in postbox 50(1)(1). As shown in FIG. 2, the postbox 50(1)(1) includes a plurality of fields, including a state field 51, an envelope 52 a buffer count field 53, a total size field 54 and a buffer list field 55. The state field 51 contains a state value identifies the state of the postbox 50(1)(1), including, for example, whether the postbox 50(1)(1) contains information relating to a new information, and whether the server process 33(1) has retrieved the information. The state value, if it indicates that the postbox 50(1)(1) contains information relating to a new information, also indicates, for example, whether the information in the postbox 50(1)(1) contains the entire information, or whether the information is stored in one or more blocks in blocks section 42, thereby enabling the server process 33(1) to determine the structure of the rest of the information in postbox 50(1)(1). Thus, when the client process 30(1)(1) loads information relating to information into the postbox 50(1)(1), it will condition the state field 51 to so indicate and further to indicate the type of information in the postbox 50(1)(1).

The envelope field contains several values, including the type of information, that is, for example, whether the information is a send information or a retrieve information, information identifier, the length of the information in, for example, bytes, the identification of the process 12(n)(m) which generated the information and the identification of the process 12(n')(m') which is to receive and process the information. In addition, the envelope field receives a checksum value which identifies the checksum for the postbox 50(1)(1).

The buffer count field 53 receives a buffer count value that identifies the number of buffers in blocks section 42 in which the information is stored, a buffer corresponding to one block or a series of blocks in the blocks section 42. The buffer list 55 identifies each of the buffers in which the information is stored. Each block is identified by an offset from the beginning of blocks section 42, and so each buffer is identified by an offset value, which points to the first block of the buffer, and a buffer count value, which identifies the number of blocks comprising the buffer. Thus, if the buffer comprises a single block, the buffer identification for that buffer in the buffer list 55 will contain, as the offset, a value corresponding to the offset from the beginning of the blocks section 42 for the block, and, as the buffer count value, a value "one" thereby to indicate that the buffer comprises a single block. On the other hand, if the buffer comprises a series of block, the buffer identification for that buffer in the buffer list will contain, as the offset, a value corresponding to the offset from the beginning of the blocks section 42 for the first block the series, and, as the buffer count value, a value corresponding to the number of blocks in the series. The total size field 54 identifies the total number of blocks in blocks section 42 in which the information is stored, and thus corresponds to the sum of the buffer count values in the buffer list 55.

After the client process 30(1)(1) has loaded either the information in the postbox 50(1)(1), or information relating to the information in the envelope, buffer count, total size and buffer list fields 52 through 55 and the respective buffers in blocks section 42, it (that is, client process 30(1)(1)) will condition the state field 51 to indicate to the server process 33(1) that a new information has been provided in the channel data structure 23(1) using the postbox 30(1)(1). The server process 33(1) will thereafter normally retrieve the information, either from the postbox 50(1)(1) or, using the information in the postbox 50(1)(1), from the blocks in blocks section 42 identified by the contents of postbox 50(1)(1) for processing. After the server process 33(1) has retrieved the contents of the postbox 50(1)(1) and, as appropriate, the contents of the blocks in blocks section 42 identified by the buffer list 55, the server process 33(1) will condition the state field 51 to so indicate. After the server process 33(1) has so conditioned the state field 51, the client process 30(1)(1) can thereafter use the postbox 50(1)(1) in connection with sending another information to the server process 33(1).

As noted above, the envelope field 52 of the postbox 50(1)(1) includes a checksum value which identifies the checksum for the envelope 52. The purpose for this is as follows. If an error occurs in connection with the information in the envelope 52, which can occur if, for example, the envelope 52 is partially or completely overwritten by another process, if the client process 30(1) makes an error in connection with generation of the values to be provided in the envelope 52, or for other reasons which will be apparent to those skilled in the art, if the server process 33(1) were to use the information an error can occur in connection with processing of the information. For example, buffer pointers in the buffer list 55 can point to the wrong blocks, in which case the information would be incorrectly processed. To facilitate a determination whether an error occurred, the client process 30(1)(1) generates the checksum when it loads the information in the envelope 52. A number of checksum generating algorithms are known to those skilled in the art. In accordance with one aspect of the invention, the server process 33(1), when it retrieves the information from the envelope 52, processes the information in the envelope 52 in the same manner to generate a checksum value and compares the generated checksum value to the checksum value in the envelope field 52. If the checksum value generated by the server process 33(1) conforms to the checksum provided in the envelope field 52, the server process 33(1) can determine with a high degree of confidence that the information in the envelope 52 is correct and can be used. Thereafter, the server process 33(1) can use the information in the postbox 50(1)(1). In that connection, if the postbox 50(1)(1) contains information, it can forward the information to the appropriate process 12(n)(m) for processing. On the other hand, if the postbox 50(1)(1) contains fields such as those depicted in FIG. 2 (that is, an envelope field 52, buffer count field 53, total size field 54 and buffer list 55), the server process 33(1) can, after verifying that the number of buffers and total number of blocks referenced by the buffer list 55 corresponds to the buffer count and total size referenced in fields 53 and 54, use the buffer pointers in the buffer list 55 to identify the blocks in blocks section 42 which contain the information retrieve the information from the blocks, and forward the information to the appropriate process 12(n)(m) for processing.

In accordance with another aspect of the invention, as noted above, the communications arrangement 20 also includes a status daemon 24 and an exit handler 25. The purpose for these components is as follows. If one of the client processes 30(c)(p) of a client 22(c) were to fail, the client 22(c) may become unreliable. In that case, if one of the client processes 30(c)(p) of a client 22(c) were to fail, the communications arrangement 20 will shut down all of the client processes 30(c)(p) of the client 22(c). The status daemon 24 monitors the status of all of the client processes 30(c)(p) of all of the clients 22(c). If the status daemon 24 determines that one of the clients 22(c) has failed, it will call the exit handler. The exit handler 25, in turn, will set the communicator status flag 43 of the channel data structure 23(c), thereby to indicate that the client 22(c) associated with the channel data structure 23(c) has a failed client process 30(c)(p) and that the communicator channel associated therewith will be shutting down.

After the communicator status flag 43 of a channel data structure 23(c) has been set, the server processes 33(p') of the server 21(c) which uses the channel data structure 23(c) will stop retrieving information therefrom, essentially shutting down the communications channel that makes use of the channel data structure 23(c) and the associated client 22(c). In addition, the status daemon 24 will enable the client-side control module 31 to mark all of the outstanding information which the server processes 30(p') had not retrieved before the communicator status flag 43 was set as having failed.

Thereafter, the processes 12(n)(m) which had issued the information which have been marked as having failed can be notified. If information was a blocking information, in which case the process 21(n)(m) which issued the information will have blocked pending completion of processing of the information, the process 21(n)(m) will be immediately notified that the information had failed, after which the process 21(n)(m) can perform predetermined operations, which may include, for example, providing a notification of the failure to an operator, shutting down, and the like, which will be apparent to those skilled in the art. On the other hand, if information was a non-blocking information, in which case the process 12(n)(m) which issued the information will continue operations, the process 21(n)(m) will be notified that the information had failed when it subsequently information the status of the information, or if it attempts to issue a subsequent information to the same client 22(c). After receiving notification that the information had failed, the process 21(n)(m) can perform predetermined operations, which may include, for example, providing a notification of the failure to an operator, shutting down, and the like, which will be apparent to those skilled in the art.

The client-side control module 31 can also be called by a server process 33(p') if it (that is, the server process 33(p')) determines that an error has occurred in connection with the channel data structure 23(c) which can occur if, as noted above, it determines that the checksum value which it generates differs from the checksum value in the postbox 50(p)(p'). If that occurs, the exit handler 24 and client-side control module 31 will operate as described above to, in the case of the exit handler 25, set the communicator status flag 43 of the channel data structure 23(c) containing the postbox 50(p)(p), and, in the case of the client-side control module 31, to shut down the client processes 30(c)(p) and mark the appropriate information as having failed.

FIG. 3 depicts data structures useful in connection with the second aspect of the invention. In particular, FIG. 3 depicts data structures which are used by the client-side control module 31 to identify the information that are associated with associated with client processes 30(c)(p) of the client 22(c) which had failed, which information, as noted above, are to be marked as also having failed. With reference to FIG. 3, the data structures include a process table 60, at least one channel data table 61(c), a protocol table 62 and at least one protocol/process list 63(c). Each communicator channel, and thus each client 22(c) will be associated with a correspondingly-indexed channel data table 61(c) and a protocol/process list 63(c). The process table 60 includes a plurality of entries, generally identified by reference numeral 60(c,p), each associated with one of the client processes 30(c)(p). Each entry 60(c,p) includes a plurality of fields, each containing information related to the respective client process 30(c)(p), including a miscellaneous process information field 70, a channel pointer field 71, a send queue pointer 72 and a protocol table pointer field 73. The miscellaneous process information field 70 receives miscellaneous information relating to the process, which may include, for example, a process identifier. The channel pointer field 71 receives a pointer to the channel data table 61(c) that is associated with the communicator channel with which the client process 30(c)(p) is associated.

The channel data table 61(c), in turn, includes a plurality of fields, including a miscellaneous communicator information field 64 and a posted receives queue pointer field 65. The miscellaneous communicator information field 64 receives miscellaneous information relating to the communicator channel with which the channel data table 61(c) is associated, including, for example, a communicator channel identifier. The posted receives queue pointer field 65 includes zero or more pointers to a posted receives queue 66.

The posted receives queue 66 is used by the servers 21(s) to acknowledge retrieval of information from the channel data structure 23(c) associated with the communication channel with which the channel data table 61(c) is associated. The posted receives queue 66, in turn, includes a plurality of entries generally identified by reference numeral 67(r) each of which identifies information which identifies a request that describes a message that is expected to be received by a server process 33(s) from the channel data structure 23(c) of the communication channel associated with the channel data table 61(c). When a server process 33(c) retrieves information from the channel data structure 23(c), it (that is, the server process 33(c)) can use the posted receives queue pointers in field 65 to identify the posted receives queue 66 associated with the communicator channel with which the channel data structure 23(c) is associated, and link an entry 66(r) thereto which identifies the information. As will be described below, the client-side control module 31 can use the entries in the posted receives queue 66 to mark the information as having been received by the server 21(s).

Returning to the entry 60(c,p) of the process table 60, the send queue pointer field 72 includes a pointer to a send information queue 74, which comprises a plurality of entries generally identified by reference numeral 75. The entries 75 in the send information queue 74 contain information that the client process 30(c)(p) is to transfer through the communicator channel, that is, that it is to load into the channel data structure 23(c), and in addition, information which have been loaded into the channel data structure 23(c) but which have not been successfully retrieved by the respective server process 33(s). In one embodiment, the send information queue 74 is in the form of a doubly-linked list and the send queue pointer actually receives three pointers, namely, a pointer to the first information in the queue 74, a pointer to the last information in the queue 74, and a pointer to the next information that is to be loaded into the channel data structure 23(c). The client-side control module 31, when the communications arrangement 20 receives information from a process 12(n)(m), can link the information as an entry 75 at the end of the send information queue, using the pointer from send queue pointer field 72 that points to the end of the send queue.

The protocol table pointer field 73 includes a pointer to one of a plurality of entries in the protocol table 62. The protocol table 62 includes a plurality of entries generally identified by reference numeral 62(c) each of which is associated with a protocol, which, in turn, corresponds to a communicator channel. The protocol table pointers in fields 73 of the entries 60(c,p) of the process table 60 for client processes 30(c)(p) which are associated with the same channel will all point to the same entry 62(c) associated with that channel, or at least to entries 62(c) which contain the same value.

Each entry 62(c) in the protocol table 62, in turn, points to a protocol/process list 63(c). The protocol/process list 63(c) includes a plurality of entries generally identified by reference numeral 63(c)(p), each of which includes a pointer to an entry 60(c,p) in the process table 60. The pointers stored in each protocol process list 63(c) point to the entries 60(c,p) which are associated with client processes 30(c)(p) associated with the communicator channel which, in turn, is associated with the entry 62(c) of the protocol table 62.

Figure 4:
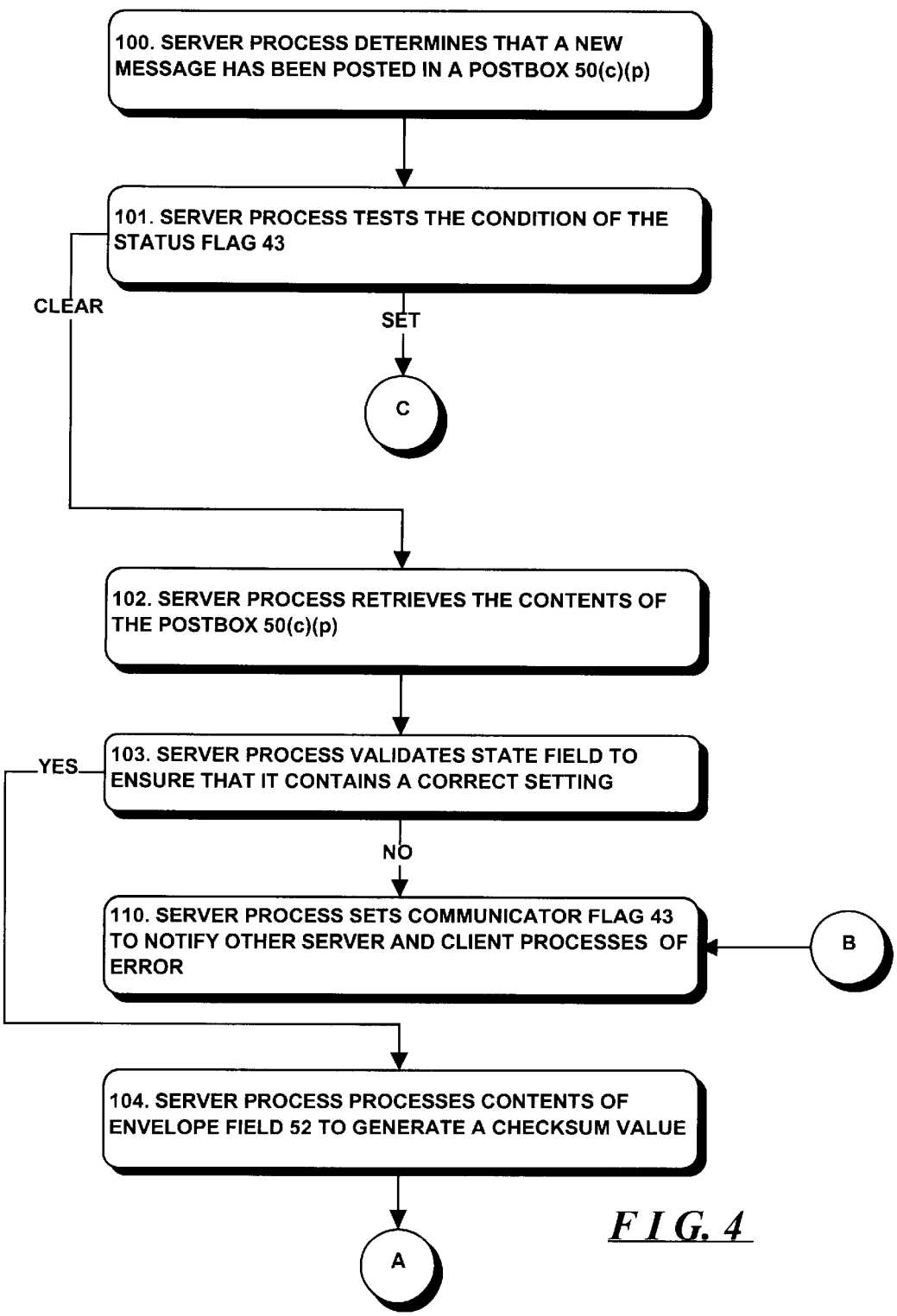
FIGS. 4 and 5 are flowcharts depicting operations performed by the communications arrangement.
Figure 4A:
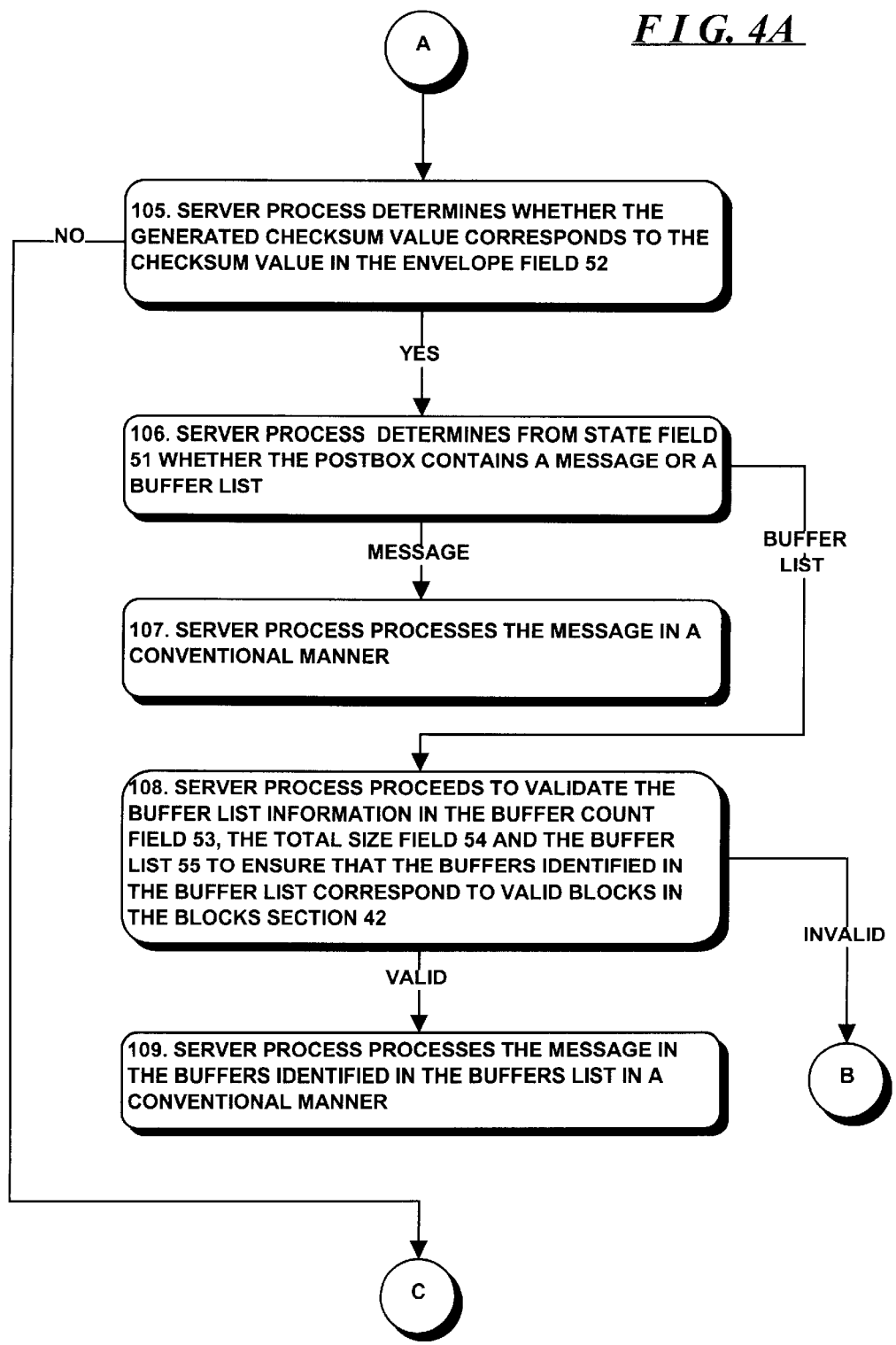
Figure 4B:
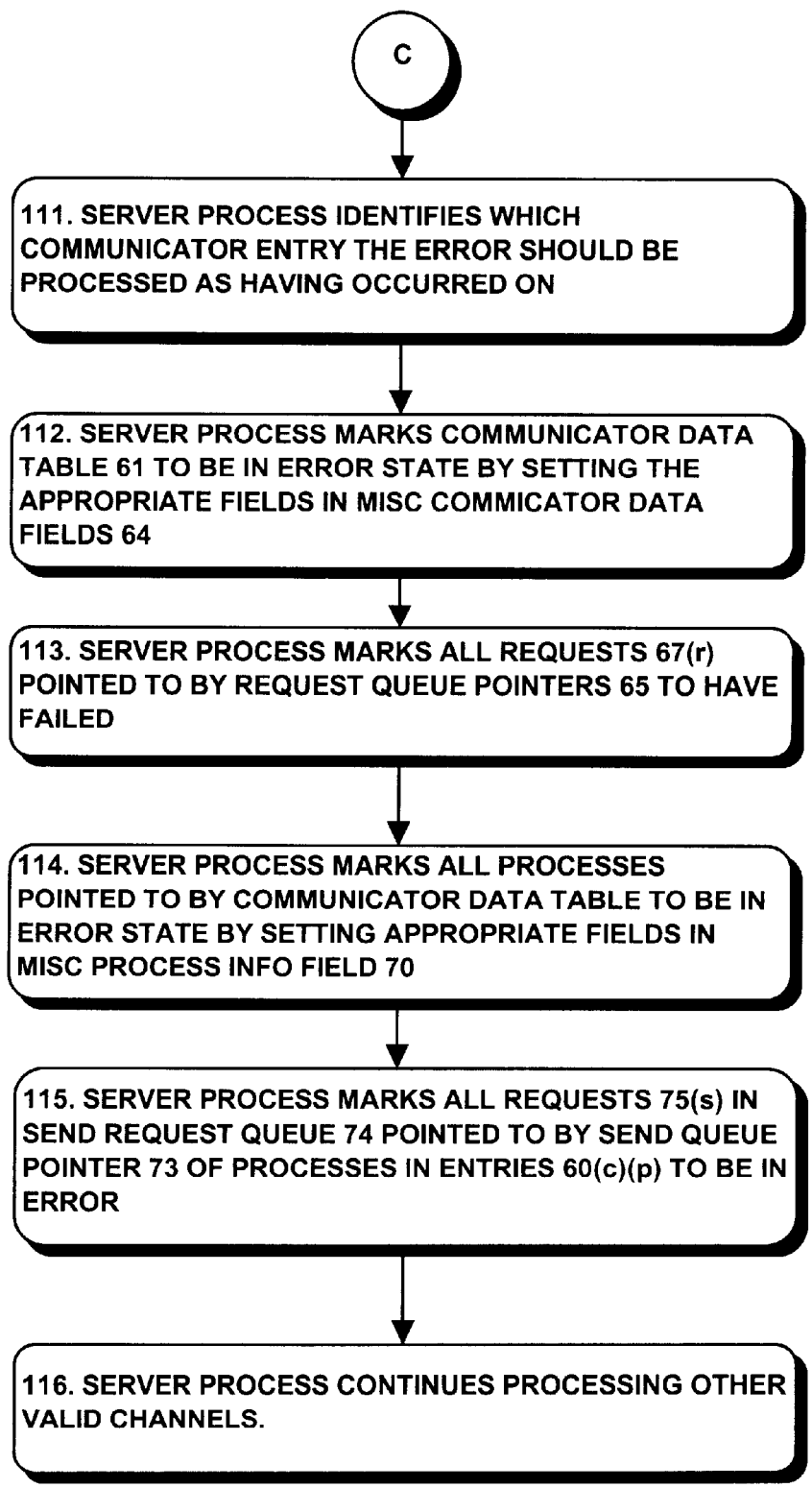

FIG. 4 depicts operations performed by the communications arrangement 20, in particular by a server process 33(s) in connection with the invention. With reference to FIG. 4, the server process 33(s) determines that information for a new message has been posted in a postbox 50(c)(p) (step 100). The server process can make the determination in step 100 by noting when the contents of the state field 51 transition to a value so indicating. When the server process 33(s) has made a positive determination in step 100, it initially test the condition of the communicator status flag 43 (step 101). If the server process 33(s) determines in step 101 that the communicator status flag 43 is clear, indicating no error in connection with the communications channel, it will retrieve the contents of the postbox 50(c)(p) (step 102) and validate the state field 51 to verify that it has one of a plurality of possible correct values (step 103). If the server process 33(s) determines that the state field does contain a valid setting, it processes the contents of the envelope field 52 to generate a checksum value (step 104) and determines whether the generated checksum value corresponds to the checksum value in the envelope field 52 (step 105).

If the server process 33(s) makes a positive determination in step 105, it will determine from the state field 51 whether the contents of the postbox is a message or a buffer list (step 106). If the server process 33(s) determines in step 106 that the postbox contains a message, it processes the message in a conventional manner (step 107).

On the other hand, if the server process determines from the state field 51 that the postbox contains a buffer list, it sequences to step 108 to validate the buffer list information in the buffer count field 53, total size field 54 and buffer list field 55 to ensure that the buffers identified in the buffer list 55 correspond to valid blocks in the blocks section 42. If the server process determines that the buffer list information is valid, it sequences to step 109 to process the message in the buffers identified in the buffer list in a conventional manner.

Figure 5:
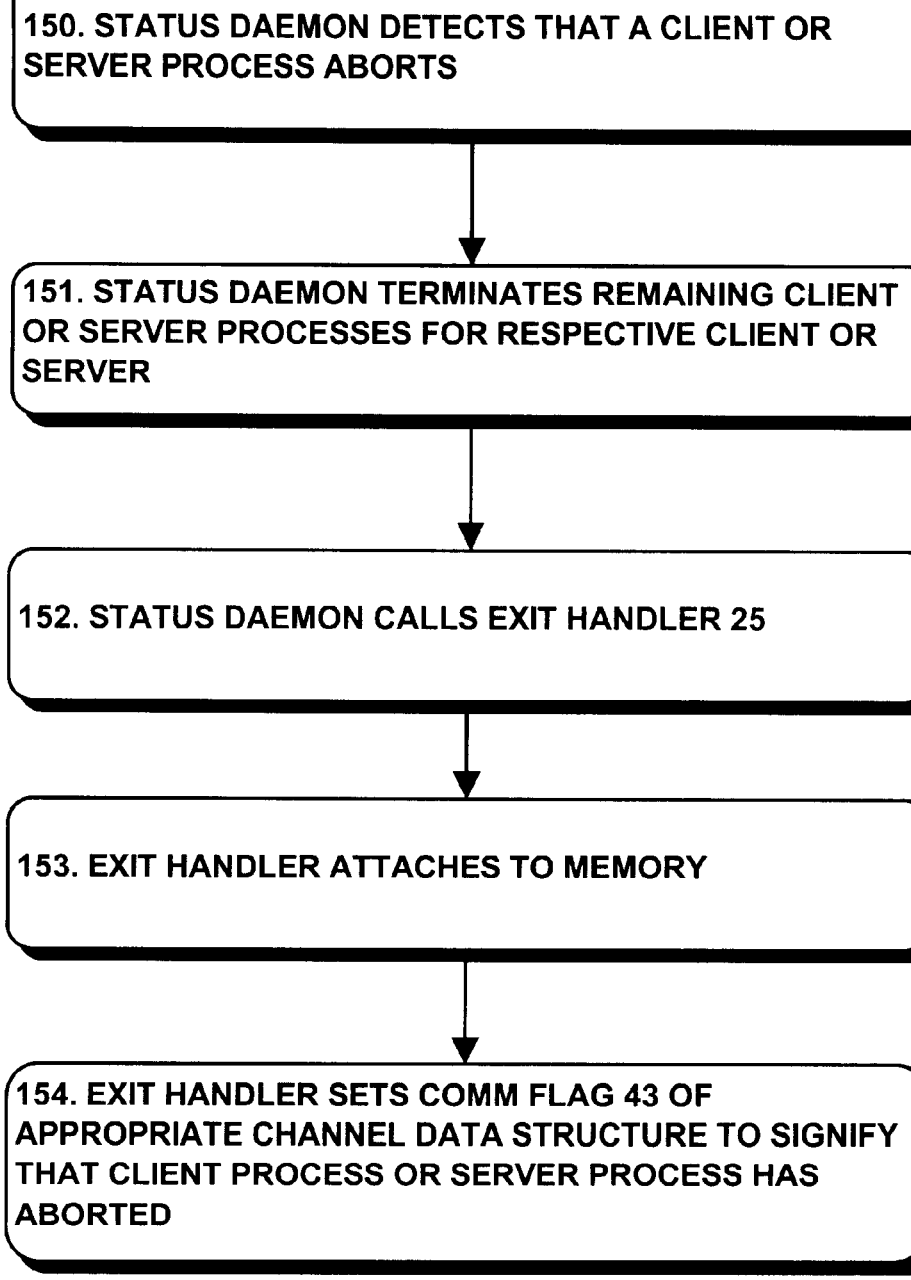

FIG. 5 is a flow chart depicting operations performed by the status daemon 24 and exit handler in connection with the invention. With reference to FIG. 5, when the status daemon determines that a client process 30(c)(p) or a server process 33(s) aborts (step 150) because of an error or otherwise (step 150), it terminates the remaining client or server processes, if any, for the respective client 22(c) or server 21 (step 151. The status daemon 24 thereafter calls the exit handler (step 152), which attaches to the memory 13(n), specifically the region thereof containing the channel data structure 23(c) (step 153) and sets the communicator flag 43 to indicate that the client process or server process has aborted.

The invention provides a number of advantages. In particular, the invention provides a communications arrangement 20 for facilitating communications among a plurality of processes 12(n)(m) using message passing. In addition, the communications arrangement 20 facilitates a notification to the server processes 33(s) of a server 22 when a communications channel, in particular, a client process 30(c)(p) thereof, fails, so that the server processes 33(s) can thereafter ignore information in the channel data structure 23(c).

It will be appreciated that a number of modifications may be made to the communications arrangement 20. For example, although the communications arrangement 20 has been described as comprising two aspects, namely, the aspect of using and controlling the condition of the communicator status flag 43 to determine and indicate the operational status of the communicator including the channel data structure 23(c) in the event of an error, and the aspect relating to use of the status daemon 24 and exit handler 25 to determine when a client process 30(c)(p) has failed and to shut down the communicator channel, it will be appreciated that a communications arrangement can include either or both of these aspects.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method for facilitating the transfer of messages between a plurality of processes via a plurality of communication channels in a computer system, the method comprising:
   a server process detecting a new message has been stored in a postbox by a client, wherein the client and the postbox correspond to a first channel of said channels;
   testing a status flag of the first channel;
   in response to detecting the status flag indicates a non-error condition, the server process:
   validating a state field of the postbox;
   retrieving the new message from the postbox, in response to determining the state field is valid; and
   setting the status flag to indicate an error condition, in response to determining the state field is not valid.

2. The method of claim 1, wherein in response to determining the state field is valid, the method further comprising:
   the server process generating a checksum value for contents of the postbox;
   comparing the generated checksum to a checksum value stored within the postbox; and
   setting the status flag to indicate and error condition, in response to detecting the generated checksum does not match the checksum value stored within the postbox.

3. The method of claim 2, further comprising shutting down said client, in response to detecting said status flag indicates an error condition.

4. The method of claim 3, wherein said client comprises a plurality of client processes, each of said client processes being configured to convey message information received from a first process to a second process.

5. The method of claim 4, wherein the first channel comprises a channel data structure, said channel data structure including said channel status flag and a plurality of postboxes, each of said postboxes corresponding to a different one of said client processes of the client.

6. The method of claim 5, wherein said server process is configured convey messages retrieved from said postbox to the second process.

7. The method of claim 6, wherein each of said communication channels corresponds to a different client of a plurality of clients and has a different associated data structure, each of said data structures including a channel status flag and a plurality of postboxes.

8. The method of claim 3, further comprising:
   monitoring client processes of said plurality of clients;
   detecting a client process of said selected client has aborted; and
   setting a channel status flag of a data structure which corresponds to the selected client to indicate an error condition.

9. A communications arrangement for facilitating the transfer of messages between a plurality of processes in a computer system, the arrangement comprising:
   a plurality of communication channels, each of said channels having an associated data structure including a status flag and a plurality of postboxes;
   a plurality of clients, each of said clients corresponding to a different one of said communication channels; and
   a server configured to receive messages conveyed by one or more of said clients, wherein said server is configured to:
   detect a new message has been stored in a postbox by a client, wherein the client and the postbox correspond to a first channel of said channels;
   test a status flag of the first channel;
   wherein in response to detecting the status flag indicates a non-error condition, the server is configured to:
   validate a state field of the postbox;
   retrieve the new message from the postbox, in response to determining the state field is valid; and
   set the status flag to indicate an error condition, in response to determining the state field is not valid.

10. The arrangement of claim 9, wherein in response to determining the state field is valid, the server is further configured to:
    generate a checksum value for contents of the postbox;
    compare the generated checksum to a checksum value stored within the postbox; and
    set the status flag to indicate and error condition, in response to detecting the generated checksum does not match the checksum value stored within the postbox.

11. The arrangement of claim 10, further comprising an exit handler configured to shut down said client, in response to detecting said status flag indicates an error condition.

12. The arrangement of claim 11, wherein said client comprises a plurality of client processes, each of said client processes being configured to convey message information received from a first process to a second process.

13. The arrangement of claim 11, further comprising a status daemon configured to:
    monitor client processes of said plurality of clients;
    detect a client process of said client has aborted;
    set a channel status flag of a data structure which corresponds to the client to indicate an error condition.

14. A computer program product for use in connection with a computer system to facilitate transfer of messages between a plurality of processes via a plurality of communication channels, the computer program product comprising a computer readable medium including program instructions which when executed:

enable a server process to detect a new message has been stored in a postbox by a client, wherein the client and the postbox correspond to a first channel of said channels;

enable the server process to test a status flag of the first channel;

in response to detecting the status flag indicates a non-error condition, enable the server process to:
  validate a state field of the postbox;
  retrieve the new message from the postbox, in response to determining the state field is valid; and
  set the status flag to indicate an error condition, in response to determining the state field is not valid.

15. The computer program product of claim 14, wherein in response to determining the state field is valid, the program instructions are further executable to cause to server process to:

generate a checksum value for contents of the postbox;

compare the generated checksum to a checksum value stored within the postbox; and set the status flag to indicate and error condition, in response to detecting the generated checksum does not match the checksum value stored within the postbox.

16. The computer program product of claim 15, wherein said program instructions are further executable to shut down said client, in response to detecting said status flag indicates an error condition.

17. The computer program product of claim 16, wherein said client comprises a plurality of client processes, each of said client processes being configured to convey message information received from a first process to a second process.

* * * * *